United States Patent Office 3,394,165
Patented July 23, 1968

3,394,165
STABILIZED METHYLENEBIS-(PHENYL ISOCYANATE) COMPOSITIONS
Thomas R. McClellan, Madison, and Richard A. Kolakowski, North Branford, Conn., assignors to The Upjohn Company, Kalamazoo, Mich., a corporation of Delaware
No Drawing. Filed Oct. 24, 1965, Ser. No. 505,059
6 Claims. (Cl. 260—453)

This invention relates to novel isocyanate containing compositions and to processes for their preparation and is more particularly concerned with novel, storage stable, compositions derived from methylenebis(phenyl isocyanate), with processes for their preparation, and with polyurethanes derived therefrom.

One of the diisocyanates commonly used in the preparation of both cellular and non-cellular polyurethanes is methylenebis(phenyl isocyanate). This material is available commercially either in substantially pure form or in admixture with related polyisocyanates having higher functionality. The latter mixtures are generally produced by phosgenation of a mixture of polyamines produced by acid condensation of formaldehyde and aniline; see, for example, U.S. Patents 2,683,730, 2,950,263, and 3,012,008. Such mixed products containing methylenebis(phenyl isocyanate) are normally liquids at temperatures of 20° C. or higher. They therefore present no difficulties in handling or dispensing through conventional foam and elastomer formulation mixing machines.

Substantially pure methylenebis(phenyl isocyanate), on the other hand, presents a problem in that it is normally a solid at room temperature (circa 25° C.) having a melting point of the order of 35 to 42° C. This material has, therefore, to be melted and maintained in a molten state in order that it can be transferred by piping and pumping arrangements normally employed in the preparation of polyurethanes.

By substantially pure methylenebis(phenyl isocyanate), as the term is employed throughout this specification and claims, is meant methylenebis(phenyl isocyanate) substantially free from, i.e. containing less than about 5% by weight, of polyisocyanates of higher functionality which are normally produced in the preparation of the crude material. The purified form of methylene-bis(phenyl isocyanate) is generally prepared by distillation of a crude mixture containing the product obtained by phosgenation of the corresponding mixed polyamine as discussed above. The product so obtained normally contains approximately 90% of 4,4'-methylenebis(phenyl isocyanate) and about 10% of the corresponding 2,4'-isomer and has a melting point of the order of about 37 to 41° C. It is to be understood however that the process and compositions of the invention are not limited to the use of a product having this particular proportion of isomers but can be applied to any methylenebis(phenyl isocyanate) product, including the individual pure 4,4'- and 2,4'-isomers, which is substantially free from polyisocyanates of higher functionality.

It is an object of the invention to convert a methylenebis(phenyl isocyanate) which is normally solid at room temperature (i.e. approximately 25° C.), to a storage stable liquid product which is suitable for transfer as a liquid using conventional procedures and apparatus for the preparation of polyurethanes. It is a further object of the invention to provide a liquid isocyanate composition which can be used in the preparation of all types of polyurethanes for which unmodified methylenebis(phenyl isocyanate) is currently employed.

These and other objects of the invention are accomplished by means of the process of the invention. The latter represents a process for producing an isocyanate composition which is a stable liquid at temperatures of above about 15° C., which process comprises heating a methylenebis(phenyl isocyanate) which is normally solid at about 15° C. with from about 2% to about 10% by weight of N,N-di(2-hydroxypropyl)aniline in the presence of a trace of phosphoric acid at a temperature of about 40° C. to about 110° C.

It has been suggested previously that a polyisocyanate such as methylenebis(phenyl isocyanate) can be reacted with polyols to form either isocyanate-terminated or hydroxy-terminated prepolymers depending on the relative proportions of isocyanate and polyol. The prepolymer so formed is then reacted with further polyol, in the case of isocyanate terminated prepolymers, or further isocyanate in the case of hydroxy terminated prepolymers, to obtain the final desired polyurethane. The prepolymers formed as intermediates in this process are, generally speaking, of relatively high molecular weight and viscosity and the properties, both physical and chemical, of the prepolymer are significantly different from those of the starting isocyanate by reason of the introduction of a plurality of recurring urethane groups in the molecule of the prepolymer.

The treatment to which the starting methylenebis(phenyl isocyanate) is subjected in the process of the present invention is clearly distinguished from this prior art procedure involving the preparation of a prepolymer. Thus, the diisocyanate which is subjected to the process of the invention is not changed significantly in physical or chemical properties. The material obtained by the process of the invention still has an isocyanate equivalent very close to that of the starting material and it behaves in all respects in substantially the same manner as the starting diisocyanate. This is a very important consideration in any treatment which is undertaken to render the normally solid isocyanate liquid at operating temperatures.

The process of the invention is carried out simply by bringing together the starting diisocyanate and the N,N-di(2-hydroxypropyl)aniline in any desired manner. The proportion of N,N-di(2-hydroxypropyl)aniline employed is advantageously within the range of about 2 to about 10% by weight of isocyanate and is preferably of the order of 4% to 6% by weight of the diisocyanate.

The two reactants are brought together in the presence of phosphoric acid the latter being employed in an amount in the range of about 0.001 to about 0.1% by weight based on the isocyanate. The phosphoric acid may be employed in the reaction in any suitable form or concentration. For example, the appropriate amount of 85%, 105% or 115% commercial grades of phosphoric acid can be employed. The exact form in which the phosphoric acid is employed is not critical but the presence of phosphoric acid in the reaction mixture is a critical feature of the process of the invention. In a preferred embodiment the phosphoric acid is added to the mixture of isocyanate and N,N-di(2-hydroxypropyl)aniline prior to the heating step of the process but, in a less preferred embodiment, the phosphoric acid is added to the mixture after the heating step has been carried out as described below.

The mixture of reactants is heated at a temperature within the range of about 40° C. to about 110° C. until a homogeneous clear liquid is obtained. Generally speaking it is only necessary to heat the mixture for a few minutes until this point is reached. The resulting product is then allowed to cool to ambient temperature and it is found that the product so obtained can be stored indefinitely at temperatures as long as 15° C. without showing any signs of solidification.

In certain cases a small amount of a very fine sediment is precipitated in the reaction product after standing for a prolonged period. Prior to usage the clear supernatant layer can be decanted from this small amount of sediment or the sediment can be removed by other conventional procedures such as filtration, centrifuging or the like.

The storage stable liquid isocyanate compositions obtained according to the invention can be used for all purposes for which the original unmodified methylenebis(phenyl isocyanate) can be used. Thus the isocyanate compositions of the invention can be used in the preparation of a variety of polyurethanes, both cellular and noncellular, which are presently prepared using unmodified methylenebis(phenyl isocyanate). Such polyurethanes include flexible, semi-rigid, and rigid foams, elastomers including fibres and filaments, sealants, supported and unsupported films, and the like.

Methods for preparing these various compositions are well-known in the art; see, for example, Saunders et al. Polyurethanes, Chemistry and Technology, Part II, Interscience Publishers, New York (1962). In general the physical properties of the polyurethane compositions prepared from the isocyanate compositions of the invention are at least as good as the properties of the corresponding compositions obtained using unmodified methylenebis(phenyl isocyanate).

The following example describes the manner and process of making and using the invention and sets forth the best mode contemplated by the inventors of carrying out the invention but is not to be construed as limiting.

Example

The methylenebis(phenyl isocyanate) employed as starting material had a melting point of 37 to 41° C. and was found by vapour phase chromatography to contain 90% by weight of 4,4'-methylenebis(phenyl isocyanate) and 10% by weight of the corresponding 2,4'-isomer. This material was obtained by distillation of a mixture of polyisocyanates containing approximately 50% of methylenebis(phenyl isocyanate) produced by phosgenation of a mixture of polyamines which latter was obtained by condensation of aniline and formaldehyde in the presence of hydrochloric acid.

A total of 206.5 g. of the above methylenebis(phenyl isocyanate) was heated to 90° C. under a pressure of 1-2 mm. of mercury. A mixture of 1 drop (.05 g.) of 85% phosphoric acid and 52 g. of N,N-di-(2-hydroxypropyl)-aniline was heated to 90 to 100° C. with thorough mixing and 15.6 g. of the mixture so obtained was added with stirring to the above methylenebis(phenyl isocyanate). The resulting mixture was heated with stirring at 110° C. and maintained at this temperature for 10 minutes before cooling to room temperature (circa 20° C.). The product so obtained was allowed to stand at room temperature overnight and was then filtered to remove a small quantity of solid which had separated. The clear blue liquid filtrate was maintained in a stoppered bottle at ambient temperatures (varying from about 16° C. to about 25° C.) for 3 months without showing any signs of solidification.

We claim:

1. An isocyanate composition which is a storage stable liquid at temperatures above about 15° C., which composition comprises the product obtained by heating a methylenebis(phenyl isocyanate) which is normally solid at about 15° C. with from about 2% to about 10% by weight of N,N-di(2-hydroxypropyl)aniline in the presence of from about 0.001% to about 0.1% by weight, based on isocyanate, of phosphoric acid at a temperature of about 40° C. to about 110° C.

2. An isocyanate composition which is a storage stable liquid at temperatures of about 15° C. which composition comprises the product obtained by heating a mixture containing approximately 90% by weight of 4,4'-methylenebis(phenyl isocyanate) and approximately 10% by weight of 2,4'-methylenebis(phenyl isocyanate) with from about 4% to about 6% by weight of N,N-di(2-hydroxypropyl)aniline in the presence of from about 0.001% to about 0.1% by weight, based on isocyanate, of phosphoric acid at a temperature of about 40° C. to about 110° C.

3. A process for producing an isocyanate composition which is a stable liquid at temperatures above about 15° C. which comprises heating a methylenebis(phenyl isocyanate) which is normally solid at about 15° C. with from about 2% to about 10% by weight of N,N-di(2-hydroxypropyl)aniline in the presence of from about 0.001% to about 0.1% by weight, based on isocyanate, of phosphoric acid at a temperature of about 40° C. to about 110° C.

4. The process of claim 3 wherein the methylenebis(phenyl isocyanate) contains approximately 90% by weight of 4,4'-methylenebis(phenyl isocyanate) and approximately 10% by weight of 2,4'-methylenebis(phenyl isocyanate).

5. A process for producing an isocyanate composition which is a stable liquid at temperatures above about 15° C. which comprises heating a methylenebis(phenyl isocyanate) which is normally solid at about 15° C. with from about 4% to about 6% by weight of N,N-di(2-hydroxypropyl)aniline in the presence of from about 0.001% to about 0.1% by weight, based on isocyanate, of phophoric acid at a temperature of about 40° C. to about 110° C.

6. The process of claim 5 wherein the methylenebis(phenyl isocyanate) contains approximately 90% by weight of 4,4'-methylenebis(phenyl isocyanate) and approximately 10% by weight of 2,4'-methylenebis(phenyl isocyanate).

References Cited

UNITED STATES PATENTS

| | | | |
|---|---|---|---|
| 2,692,874 | 10/1954 | Langerak | 260—77.5 |
| 2,999,106 | 9/1961 | Prosser et al. | 260—453 |
| 3,012,008 | 12/1961 | Lister | 260—453 XR |
| 3,179,625 | 4/1965 | Ehrhart | 260—75 |

CHARLES B. PARKER, *Primary Examiner.*

D. H. TORRENCE, *Assistant Examiner.*